US012587068B2

(12) United States Patent
Cook et al.

(10) Patent No.: US 12,587,068 B2
(45) Date of Patent: Mar. 24, 2026

(54) ELECTRIC MOTOR COOLING SYSTEM

(71) Applicant: Dana Automotive Systems Group, LLC, Maumee, OH (US)

(72) Inventors: Christopher M. Cook, McKenzie, TN (US); Matthew K. Paschall, Medina, TN (US); John Bruzewski, Buchanan, TN (US); Randy Mathis, Paris, TN (US); Dakota Foster, Paris, TN (US); Michael Kevin Nanney, Paris, TN (US); Jason Wimberley, Paris, TN (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 226 days.

(21) Appl. No.: 18/595,184

(22) Filed: Mar. 4, 2024

(65) Prior Publication Data

US 2025/0279699 A1 Sep. 4, 2025

(51) Int. Cl.
| | |
|---|---|
| *H02K 9/193* | (2006.01) |
| *H02K 9/00* | (2006.01) |
| *H02K 9/12* | (2006.01) |

(52) U.S. Cl.
CPC .................................... *H02K 9/193* (2013.01)

(58) Field of Classification Search
CPC ............. H02K 9/193; H02K 9/00; H02K 9/12
USPC ........................................ 310/52, 54, 58–59
See application file for complete search history.

(56) References Cited

U.S. PATENT DOCUMENTS

| | | | | |
|---|---|---|---|---|
| 2,928,960 | A | 3/1960 | Macks | |
| 3,592,517 | A | 7/1971 | Harris | |
| 3,922,575 | A | 11/1975 | Sauer | |
| 6,127,761 | A * | 10/2000 | Shen ...................... | H02K 3/505 |
| | | | | 310/85 |
| 11,050,320 | B2 | 6/2021 | Li et al. | |
| 11,342,812 | B2 | 5/2022 | Nakamura et al. | |
| 2002/0153784 | A1* | 10/2002 | Kanppenberger ..... | H02K 9/227 |
| | | | | 310/52 |
| 2012/0126642 | A1* | 5/2012 | Miyamoto ............... | H02K 3/24 |
| | | | | 310/54 |
| 2022/0045568 | A1 | 2/2022 | McQuoid | |
| 2022/0200417 | A1 | 6/2022 | Sachdev et al. | |

FOREIGN PATENT DOCUMENTS

| | | | | |
|---|---|---|---|---|
| DE | 102021101556 A1 * | 7/2021 | ............. | H02K 5/203 |
| EP | 1846683 B1 | 11/2009 | | |
| EP | 3048699 A1 | 7/2016 | | |
| GB | 2505479 A | 3/2014 | | |

* cited by examiner

*Primary Examiner* — Jose A Gonzalez Quinones
(74) *Attorney, Agent, or Firm* — McCoy Russell LLP

(57) ABSTRACT

Systems and methods for a sealing assembly for a motor cooling system are herein described. In one example, the sealing assembly includes an elastomeric seal interposed radially between a lateral surface of a stator of an electric motor and a sealing ring. The elastomeric seal includes a plurality of openings configured to receive a plurality of end windings of the stator and a molded annular bead arranged to define an inner diameter of the elastomeric seal and configured to be compressed axially to further separate a coolant for the plurality of end windings from a rotor.

20 Claims, 6 Drawing Sheets

ELECTRIC MOTOR COOLING SYSTEM

TECHNICAL FIELD

The present disclosure relates to an electric motor with a cooling system that includes a sealed cavity which is formed around a stator end winding.

BACKGROUND AND SUMMARY

In electric vehicle (EV) motor applications, stator winding cooling has been used in an attempt to achieve greater motor efficiency. For instance, efficiency targets may demand the flow of oil across the stator, in certain applications. However, in certain prior cooling system designs, oil is directed through interior cavities from which oil can leak into an air gap between the rotor and the stator. Oil in the air gap results in drag losses which results in a significant decrease in motor efficiency. The inventors have recognized that sealing the stator cooling arrangement off from other regions of the motor, such as the rotor cavity, may avoid an undesirable drop in motor efficiency.

One approach for a motor cooling system includes a sealing ring and a sealing sleeve. In the motor cooling system, a cavity is formed between the sealing ring and the sealing sleeve in which a stator end winding is at least partially immersed in a coolant (e.g., oil). Interfaces between the sealing ring, sealing sleeve, stator, and the rotor cavity may be sealed to reduce flow of coolant from the coolant channels to the rotor cavity. For example, some interfaces may be sealed by one or more of a gasket, an O-ring, or adhesive sealant. However, sealing a potential leak path to the air gap formed at an interface between an axial wall of the rotor cavity and the interface between the sealing ring and the stator is particularly challenging due to minimal surface area available for positioning a seal. Seal protrusion at positions past the interface and into the rotor cavity may degrade the seal, increasing risk of oil leakage from the coolant channels into the rotor cavity. Adhesive sealants may not be desirable due to chemical incompatibility with the coolant.

To overcome at least some of the abovementioned issues the inventors developed a sealing assembly for an electric motor cooling system. In one example, the sealing assembly comprises an elastomeric seal interposed radially between a lateral surface of a stator of an electric motor and a sealing ring, where the elastomeric seal comprises a plurality of openings configured to receive a plurality of end windings of the stator and a molded annular bead arranged to define an inner diameter of the elastomeric seal and configured to be compressed axially to further separate a coolant for the plurality of end windings from a rotor. In this way, a sealed cavity is provided that prevents fluid flow into the rotor cavity, and specifically to the motor's air gap. Consequently, the motor may achieve a target efficiency, if so desired.

In another example, the molded annular bead may include in an uncompressed state a sealing surface having a concave profile in cross section. The molded annular bead may include a first protrusion arranged on a first face of the elastomeric seal, a second protrusion arranged on a second face of the elastomeric seal, and a concave groove arranged axially between the first protrusion and the second protrusion. The first protrusion may ramp up and inward toward the inner diameter of the elastomeric seal, and the second protrusion may ramp down and inward toward the inner diameter of the elastomeric seal. The concave groove may include a first edge, a second edge, and groove surface extending axially therebetween. The concave groove may include the first edge positioned approximately parallel with a first planar surface of the elastomeric seal and the second edge positioned approximately parallel with a second planar surface of the elastomeric seal. In another example, upon final compression in an electric motor assembly, the molded annular bead may extend up to, and no further than, an axial wall of the sealing ring in a radially inward direction. In this way, the geometry of the molded annular bead maintains the elastomeric seal on the minimal surface area, fluidly sealing the rotor cavity from coolant without the elastomeric seal protruding into the rotor cavity.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Systems and methods for a sealing assembly for a motor cooling system are described herein. The sealing assembly includes an elastomeric seal, a sealing ring and a sealing sleeve that are compressively retained in a motor housing to form a sealed cavity around stator end windings. The sealed cavities enable coolant (e.g., oil) to be directed through the stator and a plurality of end windings of the stator while preventing the coolant from entering a rotor cavity. In particular, the elastomeric seal includes a molded annular bead that is compressed between a sealing land of the stator and the sealing ring to create a seal. The seal created via the molded annular bead may at least fluidly seal the rotor cavity at the sealing land and the sealing ring. The geometry of the molded annular bead profile compresses in a manner that does not protrude into a rotor cavity of the electric motor and allows for constant sealing pressure and contact width without over-stressing the elastomeric material. The elastomeric seal may have high compliancy, sealing the rotor cavity across a range of temperature and pressure conditions. Consequently, the sealing ring and sleeve may be securely retained within the motor with the elastomeric seal, thereby reducing the likelihood of coolant leakage from the sealed cavity. As a result, drag losses caused by coolant in the air gap can be avoided.

Figures 1, 2:
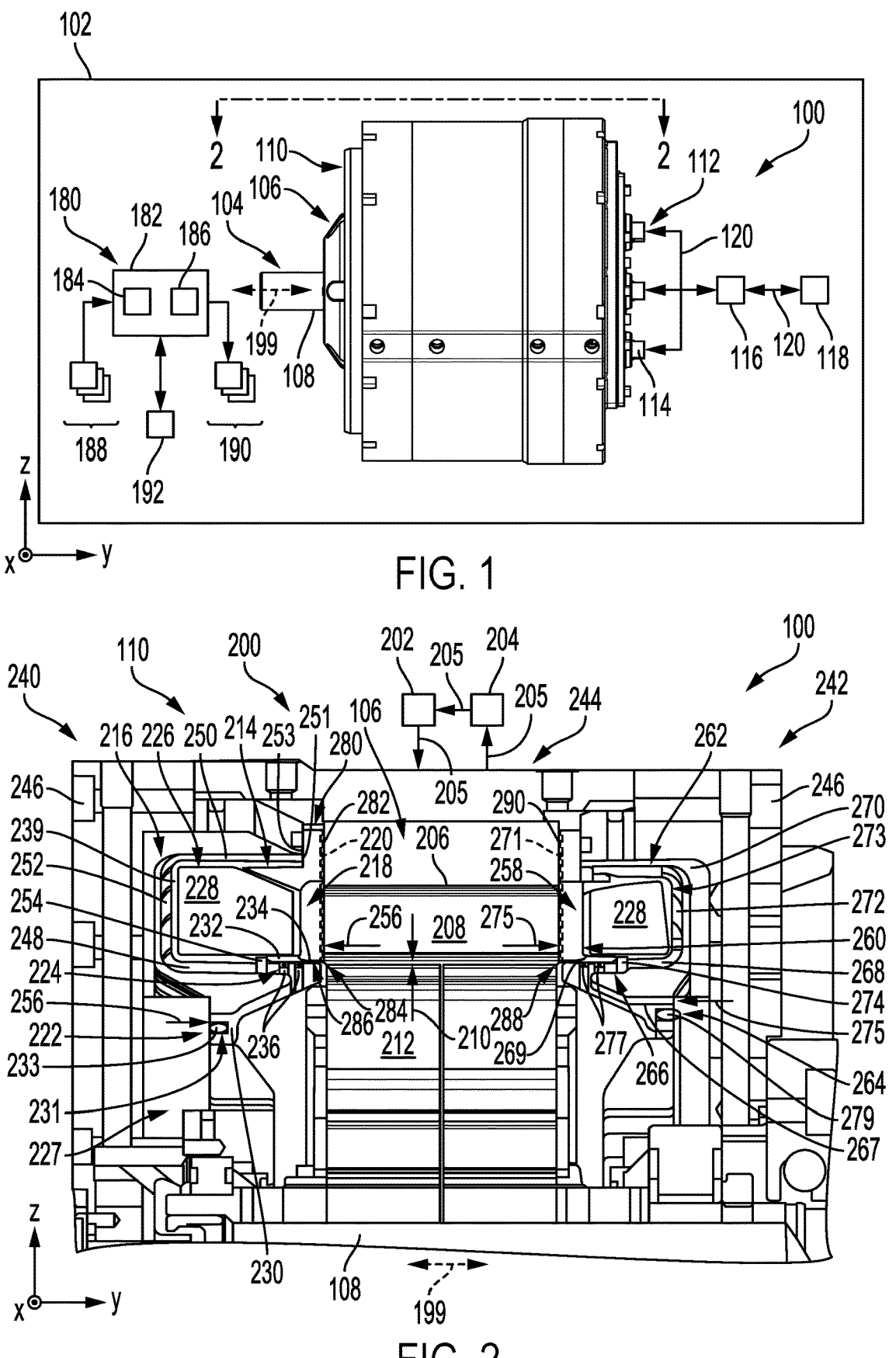
FIG. 1 shows an electric motor with a cooling system.
FIG. 2 shows a cross-sectional view of the electric motor and cooling system depicted in FIG. 1.

FIG. 1 shows an illustration of an electric motor 100. The electric motor 100 may be designed as an electric motor-generator and may be included in a system 102 which may take a variety forms. For instance, the electric motor 100 may be incorporated into an electric drive system of an electric vehicle (EV), in one example. As such, the electric motor is a traction motor and the electric drive may further include a transmission (e.g., gearbox), for instance. In the EV example, the EV may be an all-electric vehicle (e.g., a battery electric vehicle (BEV)), in one example, or a hybrid electric vehicle (HEV) with an internal combustion engine, in another example. However, the motor may be used in other suitable systems (e.g., stationary systems), in other examples, such as in industrial machines, agricultural systems, mining systems, and the like.

The electric motor 100 includes a rotor 104 that electromagnetically interacts with a stator 106 to drive rotation of a rotor shaft 108 that is included in the rotor. The electric motor 100 in the illustrated example includes a housing 110 with an electrical interface 112 for the stator 106. The electrical interface 112 may be a multi-phase electrical interface with multiple electrical connectors 114. The electrical interface 112 is a three-phase interface, in the illustrated example. However, it will be understood that the electrical interface may be a six phase interface or a nine phase interface, in other examples. More generally, the electric motor 100 may be a multi-phase alternating current (AC) machine. However, in other examples, the electric motor 100 may be a direct current (DC) machine.

As illustrated in FIG. 1, the electric motor 100 may be electrically coupled to an inverter 116. The inverter 116 is designed to covert direct current (DC) power to alternating current (AC) power and vice versa. As such, the electric motor 100 may be an AC electric motor, as indicated above. However, in other examples, the electric motor 100 may be a DC electric motor (as previously indicated) and the inverter 116 may therefore be omitted from the system 102. The inverter 116 may receive electric energy from one or more energy storage device(s) 118 (e.g., traction batteries, capacitors, combinations thereof, and the like). Arrows 120 signify the electric energy transfer between the electric motor 100, the inverter 116, and the energy storage device(s) 118 that may occur during different modes of system operation.

The system 102 may additionally include a control subsystem 180 with a controller 182. The controller 182 includes a processor 184 and memory 186. The memory 186 may hold instructions stored therein that when executed by the processor 184 cause the controller 182 to perform the various methods, control techniques, and the like, described herein. The processor 184 may include a microprocessor unit and/or other types of circuits. The memory 186 may include known data storage mediums such as random access memory, read-only memory, keep alive memory, combinations thereof, and the like.

The controller 182 may receive various signals from sensors 188 positioned in different locations in the system 102. The sensors 188 may include an electric machine speed sensor, energy storage device temperature sensor(s), an energy storage device state of charge sensor(s), an inverter power sensor, and the like. The controller 182 may also send control signals to various actuators 190 coupled at different locations in the system 102. For instance, the controller may send signals to the inverter 116 to adjust the rotational speed of the electric motor 100. In another example, the controller 182 may send a command signal to the electric motor 100 and/or the inverter 116 and in response motor speed may be adjusted. The other controllable components in the system 102 may function in a similar manner with regard to command signals and actuator adjustment.

The system 102 may also include one or more input device(s) 192 (e.g., an accelerator pedal, a brake pedal, a console instrument panel, a touch interface, a touch panel, a keyboard, combinations thereof, and the like). The input device(s) 192, responsive to user input, may generate a motor speed adjustment request.

An axis system is provided in FIG. 1, as well as FIGS. 2-7, for reference. The z-axis may be a vertical axis (e.g., parallel to a gravitational axis), the x-axis may be a lateral axis (e.g., horizontal axis), and/or the y-axis may be a longitudinal axis, in one example. However, the axes may have other orientations, in other examples. Rotational axis 199 of the electric motor 100 is further provided for reference in FIG. 1 as well as FIGS. 2-7. A cutting plane 2-2 for the cross-sectional view depicted in FIG. 2 is provided in FIG. 1. The cutting plane 2-2 extends through the rotational axis of the electric motor 100.

Features described as axial may be approximately parallel with an axis referenced unless otherwise specified. Features described as counter-axial may be approximately perpendicular to the axis referenced unless otherwise specified. Features described as radial may circumferentially surround or extend outward from an axis, such as the axis referenced, or a component or feature described prior as being radial to a referenced axis, unless otherwise specified. Unless otherwise specified, the axis referenced may be the rotational axis 199.

FIG. 2 shows a cross-sectional view of the electric motor 100 and the cooling system 200 for the motor. The rotor 104 and the stator 106 of the electric motor 100 are again depicted along with the housing 110 that at least partially encloses the rotor and the stator. The rotor shaft 108 is further illustrated in FIG. 2.

The cooling system 200 may include a pump 202 and a filter 204 may uptake and deliver a coolant (e.g., oil such as a natural and/or synthetic oil) into the stator 106. The pump 202 may create a pressure differential by which the pump 202 may uptake and pressurize coolant. The filter 204 may remove particulates and other impurities from the coolant. Arrows 205 depict the flow of coolant between the pump 202, the filter 204, and the cooling system 200. To elaborate, the pump 202 may deliver coolant to coolant passages 206 that axially traverse a stator core 208 of the stator 106, in one example. However, other coolant flow patterns may be used in other examples. The pump 202 and the filter 204 are schematically depicted. However, it will be understood that they may have greater complexity, in practice. Further, the pump and the filter are shown spaced away from the electric motor 100.

An air gap 210 is formed between a rotor core 212 of the rotor 104 and the stator core 208. Due to the sealing of the coolant in the cooling system 200 expanded upon herein, the likelihood of coolant entering the air gap 210 is substantially reduced (e.g., avoided).

The cooling system 200 further includes a first sealing ring 214 and a first sealing sleeve 216 positioned on a first axial side 218 of the stator 106 (e.g., the stator core 208). The first axial side 218 may specifically be a weld side, in one example. The first sealing ring 214 may be coupled to the stator 106 (e.g., the stator core). However, in other examples, the first sealing ring may be machined or otherwise integrally formed in the stator 106.

The first sealing sleeve 216 and the first sealing ring 214 are coupled via a first sealing interface 222 and a second sealing interface 224. The first sealing sleeve 216 and the stator 106 meet at a first lateral sealing interface 284. The first sealing interface 222, the second sealing interface 224, and the first lateral sealing interface 284 form a sealed cavity 226 in which the stator end winding 228 are positioned. The sealed cavity 226 may receive and/or deliver coolant to/from the coolant passages 206 in the stator core 208. For example, the sealed cavity 226 may at least partially immerse the stator end windings at in coolant. The sealed cavity 226 is fluidly separated from a rotor cavity 227. In this way, coolant entering the air gap may be avoided, thereby increasing motor efficiency.

The first sealing interface 222 may be formed between the housing 110 and an extension 230 of the first sealing sleeve 216 that is positioned radially inward from the end windings 228. To elaborate, the first sealing interface 222 may include a recess 231 profiled to receive a seal 233 such as an O-ring, a gasket, a diamond seal, and/or another type of liquid seal. The extension 230 of the first sealing sleeve 216 may taper in an axially inward direction (to increase the strength of the sleeve when compared to a shoulder formed as a thinner wall The first sealing ring 214 includes a flange 232 that axially extends outward from the first axial side 218 of the stator 106. The flange 232 seals against an interior surface 234 of the first sealing sleeve 216 to form the second sealing interface 224. The second sealing interface 224 may specifically be a radial sealing interface. Therefore, at the second sealing interface 224, the flange 232 and the interior surface 234 of the first sealing sleeve 216 enable a strong seal to be achieved. However, it is to be appreciated that other types of sealing interfaces may be used in other examples. The interior surface 234 of the first sealing sleeve 216 may include recesses sized to receive seals 236 such as O-rings, grommets, or a liquid seal.

The second sealing interface 224 may be positioned radially inward from the stator end winding 228 but radially outward from the first sealing interface 222, in one example. In this way, the sealed cavity 226 may be securely sealed to provide a coolant enclosure for the end windings 228. Coolant 239 circulates around the cavity and specifically through the end windings 228, in this way increasing stator cooling when compared to systems that solely direct coolant around the end windings 228.

The first lateral sealing interface 284 may be a radial seal formed between a lateral surface 282 of the stator 106 and the flange 232 of the first sealing ring 214. For example, the first lateral sealing interface 284 may be positioned axially inward from the first axial side 218 of the stator 106. In other words, the first lateral sealing interface 284 may be positioned to the right of the second sealing interface 224 along the y-axis. The first lateral sealing interface 284 may include a gasket, a diamond seal, a liquid seal, and/or an elastomeric seal 220 of the present disclosure. The elastomeric seal 220 is represented schematically.

In one example, the elastomeric seal 220 may be interposed radially, with respect to the rotational axis 199, between the first sealing ring 214 and the lateral surface 282 of the stator 106, positioned adjacent to the air gap 210. The elastomeric seal 220 may include openings configured to receive the end windings 228. The elastomeric seal 220 may extend radially from an inner circumferential section 286 of the first sealing ring 214 to an outer circumferential section 280 of the first sealing ring 214, the inner circumferential section 286 facing the rotor core 212 and the outer circumferential section 280 facing the housing 110. The first lateral sealing interface 284 including the elastomeric seal 220 further separates the coolant 239 from the air gap 210. In this way, the sealed cavity 226 is fluidly isolated from the rotor cavity 227. Examples of the elastomeric seal 220 are described in more detail with reference to FIGS. 3-7.

The housing 110 may be formed in different sections that are coupled to one another, in one example. For instance, a crown side section 240 and a weld side section 242 may be coupled to a housing body 244. The housing body 244 may circumferentially enclose the stator 106 and sealing sleeves and rings in the cooling system 200. Fasteners 246 and/or other suitable attachment devices may be used to attach the crown side section 240 and/or the weld side section 242 to the housing body 244.

The first sealing sleeve 216 may include an inner radial wall 248, an outer radial wall 250, and an axial wall 252 that allow for the sealed cavity 226 to enclose the end windings 228. However, other contours of the first sealing sleeve 216 may be used in other examples. For instance, the first sealing sleeve may include curved sections that enclose the end windings.

An end 251 of the outer radial wall 250 may be adjacent to or in face sharing contact with a surface 253 of an outer circumferential section 280. When the first sealing ring 214 is attached to the first sealing sleeve 216, the outer radial wall 250 of the first sealing sleeve 216 may be adjacent to or in contact with the outer circumferential section 280 and may overlap an outer flange (not shown). In this way, the upper section of the sealed cavity 226 may be created.

The first sealing sleeve 216 in the second sealing interface 224 includes a shoulder 254 that allows for the axial compression of the sealing assembly to be tuned. To elaborate, the shoulder 254 hard mounts to the first sealing ring 214, when the sealing assembly is installed in the housing 110 under compression. Arrows 256 indicate the compressive force exerted on the assembly formed between the first sealing ring 214 and the first sealing sleeve 216. In this way, the first sealing ring and the sleeve may be effectively maintained in a desired position. Due to this compressive attachment of the sealing ring and sleeve in the housing, the use of attachment devices for securing the ring and/or sleeve to the housing may be avoided, if desired. Consequently, manufacturing efficiency may be increased in relation to systems which utilize fasteners. A second sealing ring 260 and a second sealing sleeve 262, described in greater detail herein, may be compressed in a similar manner.

The coolant passages 206 may extend through the stator core 208 from the first axial side 218 to a second axial side 258. In this way, coolant axially traverses the stator to enable heat to be effectively removed therefrom. The motor can consequently achieve greater efficiency, if so desired, when compared to prior motor cooling systems.

A second sealing ring 260 and a second sealing sleeve 262 are positioned on the second axial side 258 (e.g., a crown side) of the stator 106, in the illustrated example. However, in other examples, the second sealing ring and sleeve may be omitted from the motor cooling system.

Similar to the first sealing ring 214 and the first sealing sleeve 216, the second sealing ring 260 and the second sealing sleeve 262 may form a third sealing interface 264 and a fourth sealing interface 266. The second sealing ring 260 and the stator 106 may form a second lateral sealing interface 288. Again, the third sealing interface 264 may be a face seal formed between the housing 110 and an extension 267. The fourth sealing interface 266 may be a radial seal formed between a flange 269 of the second sealing ring 260. The second lateral sealing interface 288 may be a radial seal formed between a lateral surface 290 of the stator 106 and the flange 269 of the second sealing ring 260. The second sealing ring 260 and the second sealing sleeve 262 may be differently sized from the first sealing ring 214 and the first sealing sleeve 216 to accommodate for the varied sizes of the weld and crown side end windings. However, the second sealing ring 260 and the second sealing sleeve 262 may include similar structural features to those included in the first sealing ring 214 and the first sealing sleeve 216. However, as expanded upon herein the second sealing sleeve may be contoured to accommodate for attachment between the electrical interface 112 and the stator end winding 228.

An elastomeric seal 271 may be interposed radially between the lateral surface 290 of the stator core 208 and the second sealing ring 260, in one example. Similar to the elastomeric seal 220, the elastomeric seal 271 may further separate coolant for the end windings from the rotor core 212. However, in another example, the second sealing ring may be adhesively attached to the stator via an adhesive. Seals 277 may be included in the fourth sealing interface 266 and a seal 279 may be included in the third sealing interface 264. The seal 279 may include one or more of an O-ring, a gasket, a diamond seal, and a liquid seal. Further, the seals 277 may include one or more O-rings, grommets, and/or liquid seals.

The second sealing sleeve 262 may include an inner radial wall 268, an outer radial wall 270, and an axial wall 272 that allow for a sealed cavity 273 to enclose the end windings 228. However, other contours of the second sealing sleeve 262 may be used in other examples.

The second sealing sleeve 262 again includes a shoulder 274 that has axially compressive force transmitted therethrough to enable the axial compression of the sealing assembly formed between the second sealing sleeve 262 and the second sealing ring 260 to be tuned as desired. This axial compression is represented via arrows 275.

Figure 3:
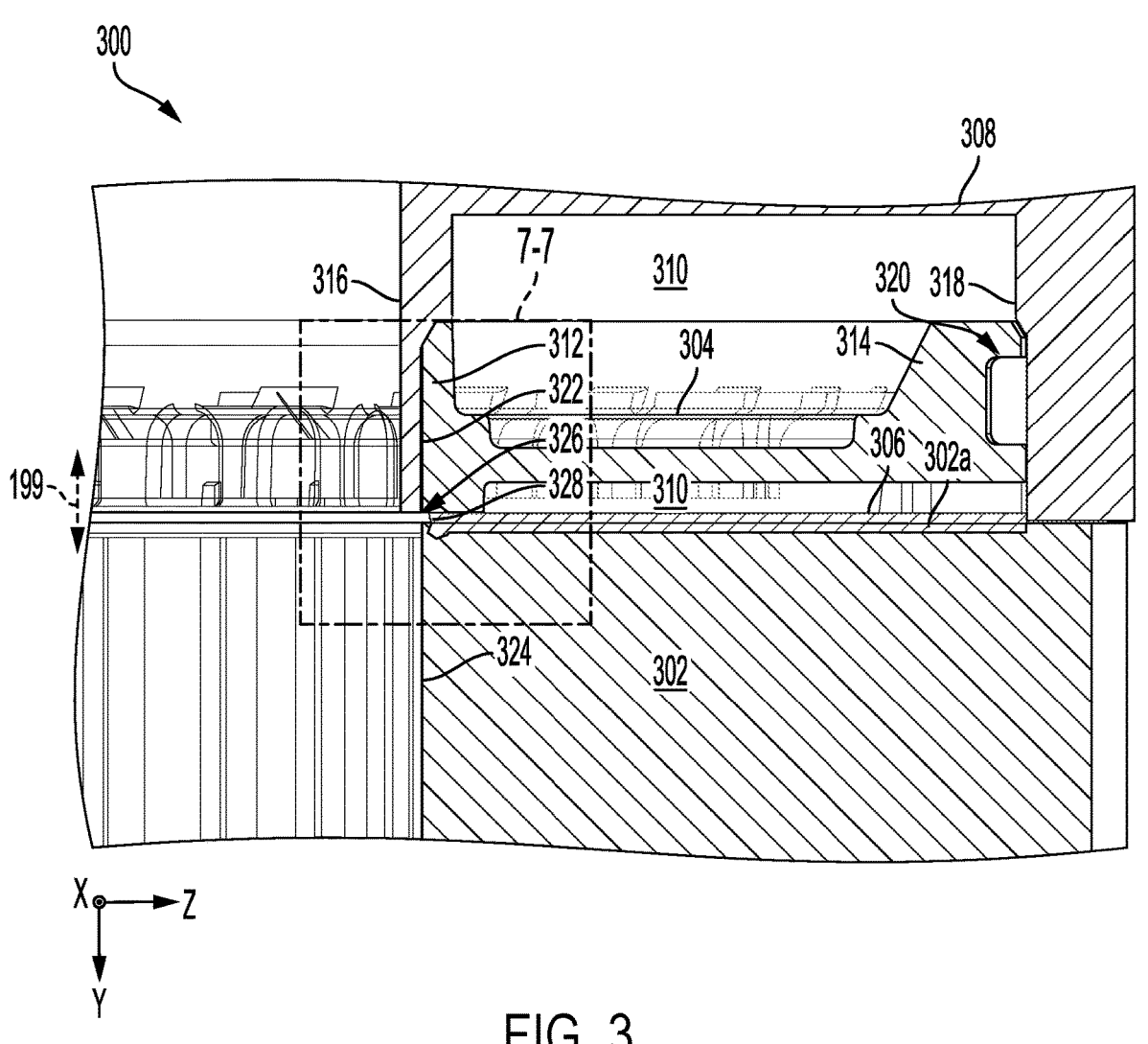
FIG. 3 shows an example electric motor with a sealing ring, sealing sleeve, and example of an elastomeric seal.
Figure 7:
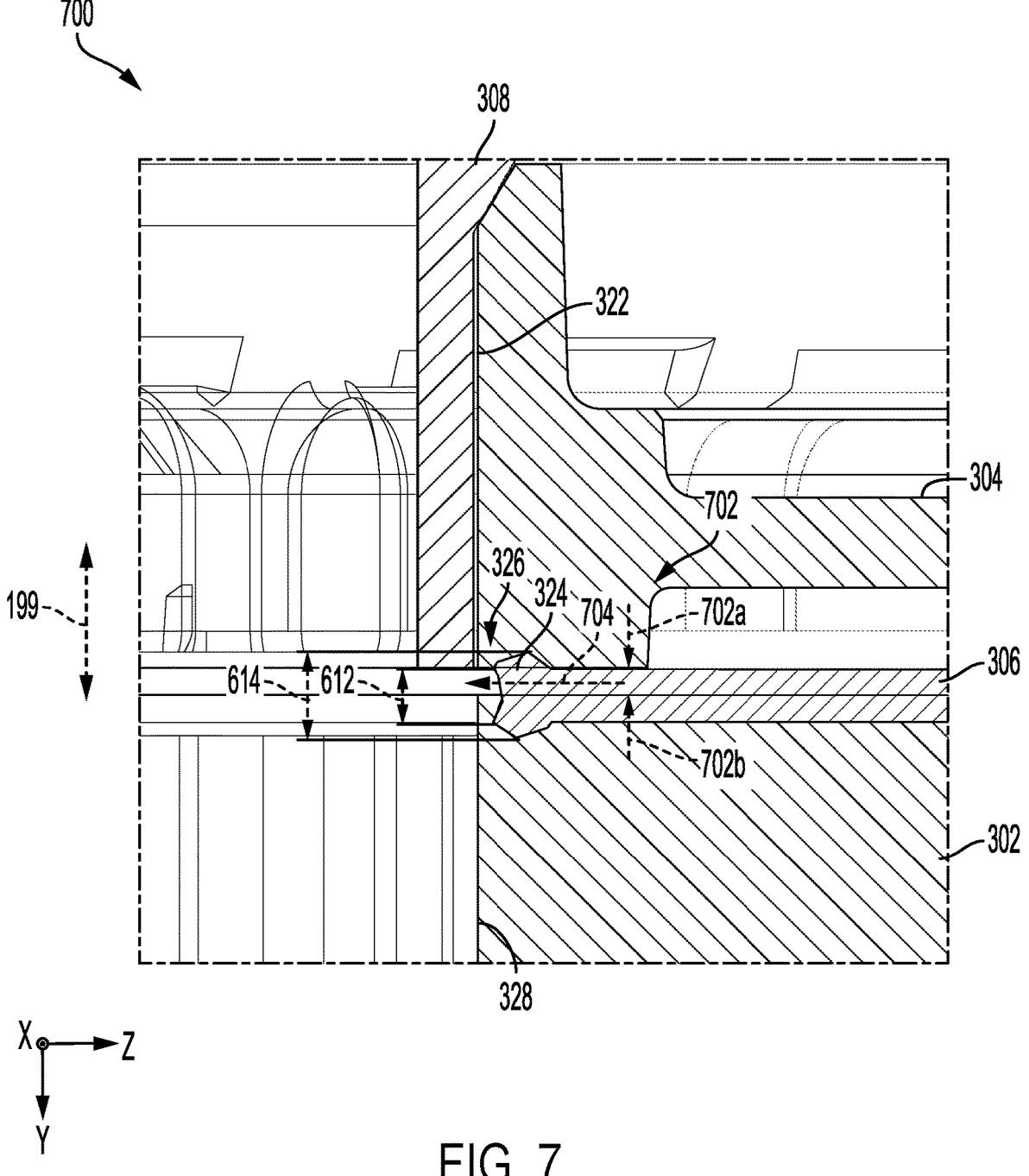
FIG. 7 shows an enlarged view of the example electric motor depicted in FIG. 3.

Turning to FIG. 3, a sealing assembly 300 of a cooling system of an electric motor is depicted, which may be embodiments of the cooling system 200 and electric motor 100 of FIGS. 1 and 2, respectively. The sealing assembly 300 of the cooling system may include an elastomeric seal 306 interposed radially between a lateral surface 302a of a stator 302 and a sealing ring 304. The lateral surface 302a may be adjacent to or in contact with the sealing ring 304 and the elastomeric seal 306, the elastomeric seal 306 being compressed axially against both of the lateral surface 302a and the sealing ring 304. A sealing sleeve 308 may circumferentially surround the sealing ring 304, forming a sealed cavity 310 therebetween. The elastomeric seal 306 is in fluid communication with the sealed cavity 310. The elastomeric seal 306 may be an embodiment of the elastomeric seals 220, 271 described above with respect to FIG. 2. A box 7-7 for the detail view depicted in FIG. 7 is provided in FIG. 2. The box 7-7 depicts a sealing interface formed between the sealing ring 304, the lateral surface 302a, and the elastomeric seal 306.

The sealing ring 304 may include an inner flange 312 and outer flange 314. The sealing sleeve 308 may include an inner radial wall 316 and an outer radial wall 318. The outer radial wall 318 of the sealing sleeve 308 may be adjacent to or in contact with the outer flange 314 of the sealing ring 304. The inner radial wall 316 may be adjacent to or in contact with the inner flange 312. As described above with reference to FIG. 2, there may be one or more of an O-ring, a gasket, a diamond seal, and a liquid seal interposed between the sealing ring 304 and the sealing sleeve 308 at one or more sealing interfaces formed there between, such as sealing interface 320. In this way, the sealing ring 304 and the sealing sleeve 308 create the sealed cavity 310.

The inner flange 312 may include a first axial wall 322 and the stator 302 may include a second axial wall 324, the first axial wall 322 and the second axial wall 324 both extending in parallel axially with respect to the rotational axis 199. A sealing interface 326 is formed between the first axial wall 322 and the second axial wall 324. In one example, the sealing interface 326 comprises a sealing land having minimal available area for contact and sealing with a gasket. In one example, the sealing land may be approximately 2 mm. The elastomeric seal 306 is configured to seal the sealing interface 326. In particular, the elastomeric seal 306 includes a molded annular bead 328 arranged to define an inner diameter of the elastomeric seal 306. The molded annular bead 328 is configured to be compressed axially, thereby sealing the sealing interface 326. In this way, the elastomeric seal 306 further separates a coolant enclosed in the sealed cavity 310 and circulating through the cooling system from a rotor (e.g., rotor core 212 in FIG. 2).

Figure 4:
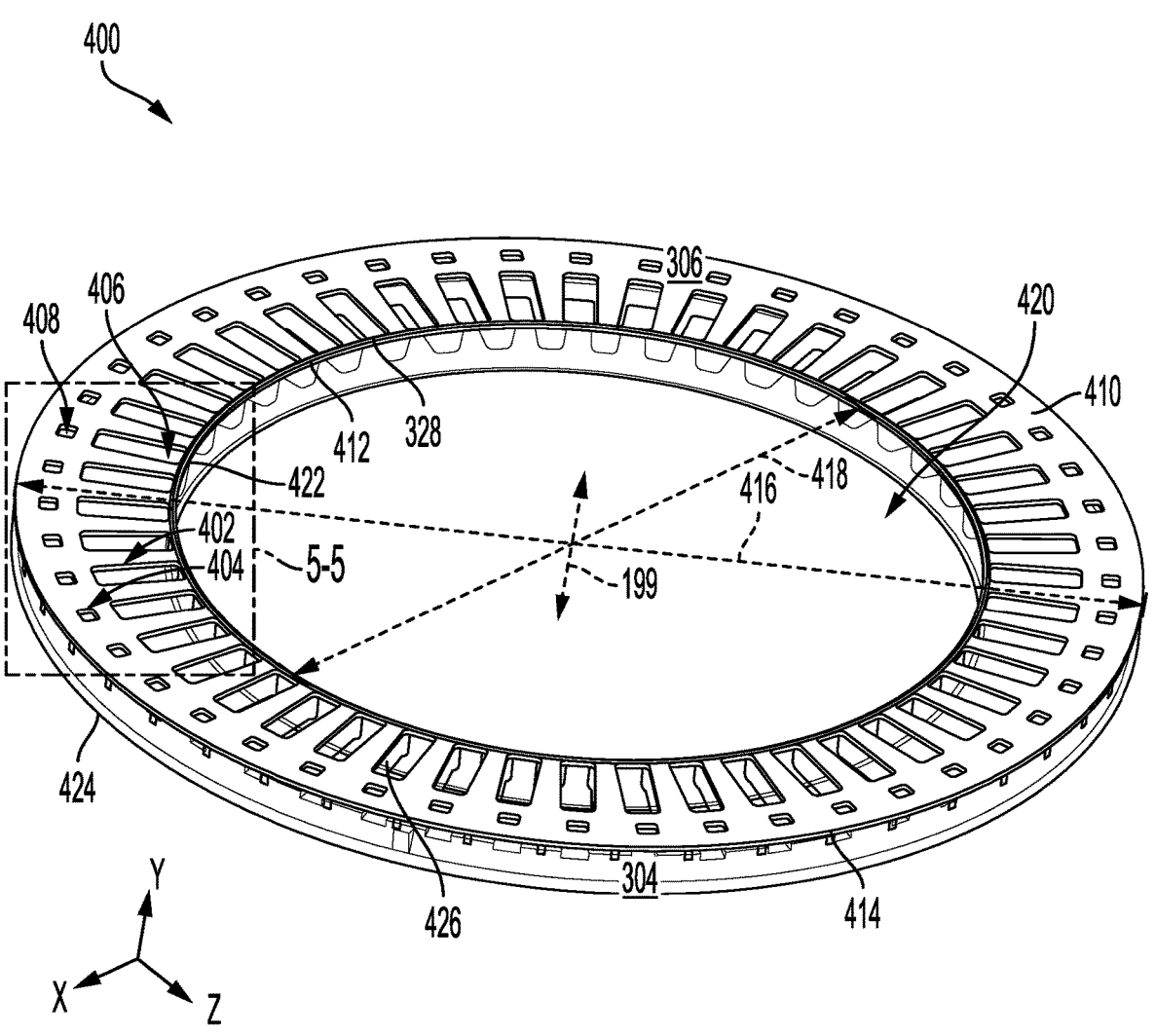
FIG. 4 shows an underside view of the elastomeric seal and sealing ring depicted in FIG. 3.
Figure 5:
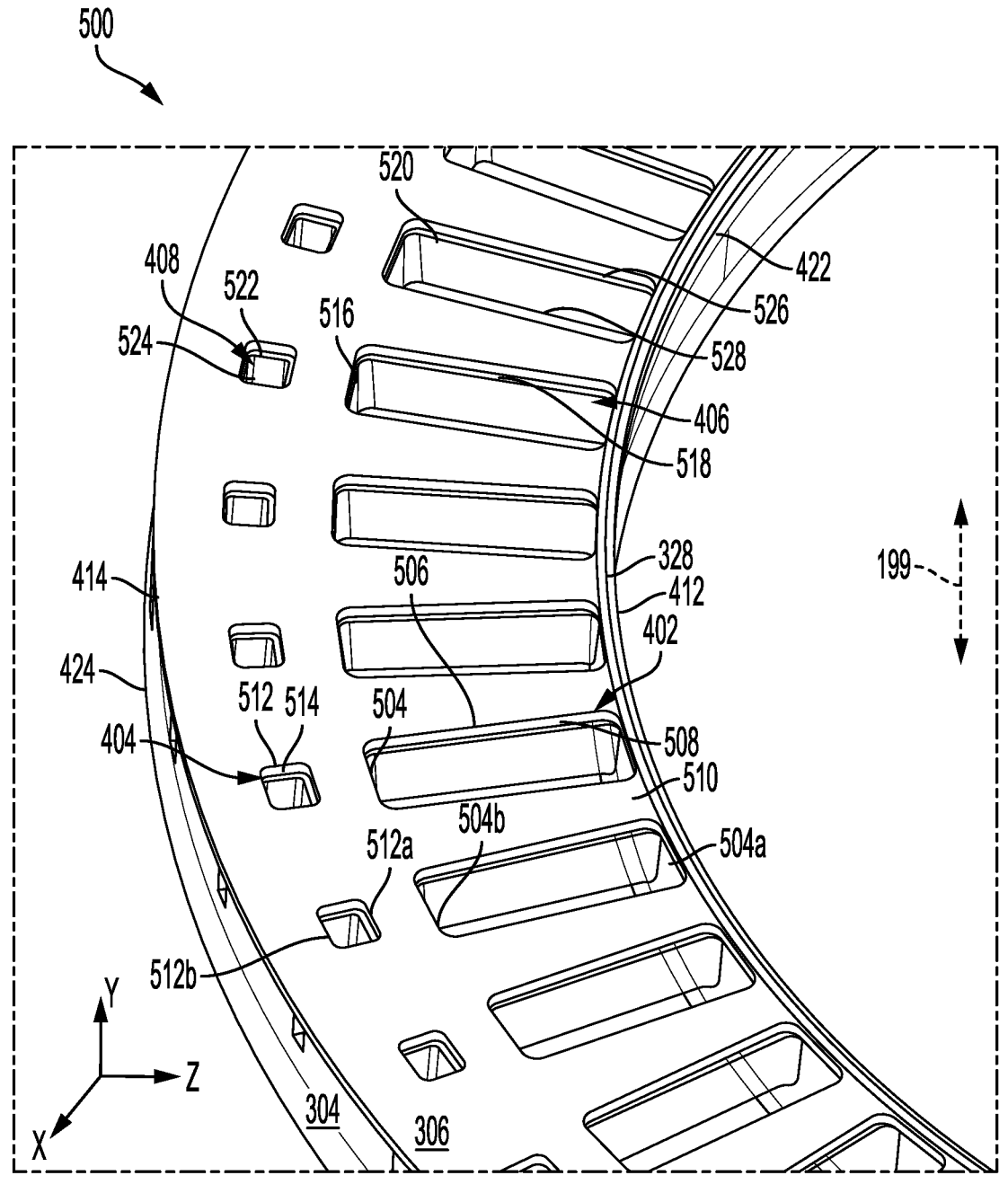
FIG. 5 shows an enlarged view of the underside view of the elastomeric seal and sealing ring depicted in FIG. 4.

FIG. 4 shows an underside view 400 of the sealing ring 304 and the elastomeric seal 306 of the sealing assembly 300 of a cooling system of an electric motor. The elastomeric seal 306 is shown in an uncompressed state. Elements introduced with reference to FIG. 3 are numbered similarly and not reintroduced. A box 5-5 for the enlarged view depicted in FIG. 5 is provided in FIG. 4.

In one example, the elastomeric seal 306 may include an inner circumference 412, an outer circumference 414, an outer diameter 416, and an inner diameter 418. The elastomeric seal 306 may be substantially annular (e.g., ring-shaped) including a central opening 420. The elastomeric seal 306 may be radially symmetric relative a central axis that is coaxial with the rotational axis 199. The elastomeric seal 306 may be substantially planar (e.g., flat), including a planar portion 410 extending radially from the molded annular bead 328 to the outer diameter 416. The elastomeric seal 306 includes a plurality of openings including a plurality of square openings 404 arranged radially outward from a plurality of rectangular openings 402. The plurality of openings may be arranged in the planar portion 410 and surrounding the central opening 420. In one example, each square opening of the plurality of square openings 404 may be radially aligned with a rectangular opening of the plurality of rectangular openings 402 with respect to the rotational axis 199. To elaborate, each of square opening of the plurality of square openings 404 and each of rectangular opening of the plurality of rectangular openings 402 may be sectioned symmetrically by a common axis or line that intersects the rotational axis 199.

The sealing ring 304 may include an inner circumference 422 and an outer circumference 424 that respectively align with the inner circumference 412 and the outer circumference 414 of the elastomeric seal 306. To elaborate, the inner circumference 422 and the inner circumference 412 super impose and the outer circumference 424 and the outer circumference super impose 414 when the sealing ring 304 contacts the elastomeric seal 306. The sealing ring 304 may include a plurality of channels, including a plurality of first channels 406 arranged radially outward from a plurality of second channels 408. The plurality of first channels 406 and the plurality of second channels 408 may respectively align with the plurality of rectangular openings 402 and the plurality of square openings 404. To elaborate, the plurality of first channels 406 align directly over the corresponding rectangular openings 402. Similarly, the plurality of second channels 408 superimpose with the square openings 404. The first channels 406 may be formed between baffles 426 that extend in radial directions and are aligned with a stator (e.g., stator 106 in FIGS. 1-2) such that coolant passes through the first channels 406 and is directed towards the end windings. The first channels 406 may have a rectangular cross-sectional contour, in one example. However, other channel profiles have been contemplated.

The plurality of rectangular openings 402 are shaped to receive the plurality of end windings of a stator (e.g., end windings 228 of stator 106 in FIG. 2). The plurality of square openings 404 are configured to be in fluid communication with the plurality of rectangular openings 402 and the cooling system (e.g., cooling system 200 in FIG. 2). For example, the elastomeric seal 306 may be arranged over the end windings against the lateral surface 302a of the stator 302 (e.g., see FIG. 3). The end windings may pass through the plurality of rectangular openings 402, through the plurality of first channels 406, into the sealed cavity (e.g., sealed cavity 310 in FIG. 3). Coolant may enter through the plurality of rectangular openings 402 into the sealed cavity via the first channels 406 where the coolant may exchange heat with the stator windings, and exit the sealed cavity through the plurality of second channels 408 aligned with the square openings 404.

In one example, the elastomeric seal 306 may be relatively more flexible, more compressible, and more compliant than the sealing ring 304, the sealing sleeve 308, or the stator 302 (see FIG. 3). In one example, the elastomeric seal 306 may be formed from molded rubber and the plurality of rectangular openings 402 and the plurality of square openings 404 may be die cut. Additionally, or alternatively, the elastomeric seal 306 may be formed from acrylic, sponge rubber, ceramic paper, or polyurethane. The sealing ring 304 and the sealing sleeve 308 may be formed from relatively more rigid materials, such as metal, ceramic, or composites of metal or ceramic. In this way, at least some portions of the geometry of the elastomeric seal 306 may change when compressed axially between the sealing ring 304, the stator 302 and the sealing sleeve 308. The geometry of the elastomeric seal, and how at least some of the geometry may change under various pressure and heat conditions is described in more detail below.

FIG. 5 shows an enlarged view 500 of the underside view 400 of the sealing ring 304 and the elastomeric seal 306 depicted in FIG. 4. Elements introduced with reference to FIGS. 3-4 are numbered similarly and not reintroduced.

The enlarged view 500 shows the plurality of rectangular openings 402 and the plurality of square openings 404 are radially arranged in the planar portion 410 of the elastomeric seal 306. The plurality of rectangular openings 402 and the plurality of square openings 404 may be radially arranged with respect to the rotational axis 199. In one example, each rectangular opening of the plurality of rectangular openings 402 may be defined by an opening on a first face 510 of the elastomeric seal 306, an opening on an opposing, second face 610 (e.g., see FIGS. 6A-6B), and a rectangular surface 508. Each rectangular opening of the plurality of rectangular openings 402 may include pair of long sides 506 and a pair of short sides 504 arranged perpendicular to the pair of long sides 506. The plurality of rectangular openings 402 may include a first short side 504a and a second short side 504b. The first short side 504a of each of the plurality of rectangular openings 402 may abut the molded annular bead 328. The second short side 504b may face one of the plurality of square openings 404. Each square opening of the plurality of square openings 404 may be defined by an opening on the first face 510 of the elastomeric seal 306, an opening on the second face 610, and a square surface 514. Each square opening of the plurality of square openings 404 may include four perpendicularly arranged sides 512. The plurality of square openings 404 and sides 512 may include a first side 512a facing the outer circumference 414 and a second side 512b facing one of the plurality of rectangular openings 402.

The enlarged view 500 shows the plurality of first channels 406 and the plurality of second channels 408. Each first channel of the plurality of first channels 406 may be defined by an opening on a first face 526 of the sealing ring 304, an opening on an opposing, second face 528, and a first channel surface 520. Each first channel of the plurality of first channels 406 includes a pair of first channel long sides 518 and a pair of first channel short sides 516 arranged perpendicular to the pair of first channel long sides 518. Each second channel of the plurality of second channels 408 may be defined by an opening on the first face 526 of the sealing ring 304, an opening on the second face 528, and a second channel surface 524. Each second channel of the plurality of second channels 408 includes four perpendicularly arranged second channel sides 522. The plurality of first channels 406 and the plurality of second channels 408 are shaped similarly and respectively aligned with the plurality of rectangular openings 402 and the plurality of square openings 404. In this way, the sealing ring 304 and elastomeric seal 306 direct a flow of coolant from the plurality of coolant passages in the stator towards the plurality of end windings in the sealed cavity (e.g., from the coolant passages 206 to the end windings 228 in sealed cavity 226 in FIG. 2).

Figures 6A, 6B:
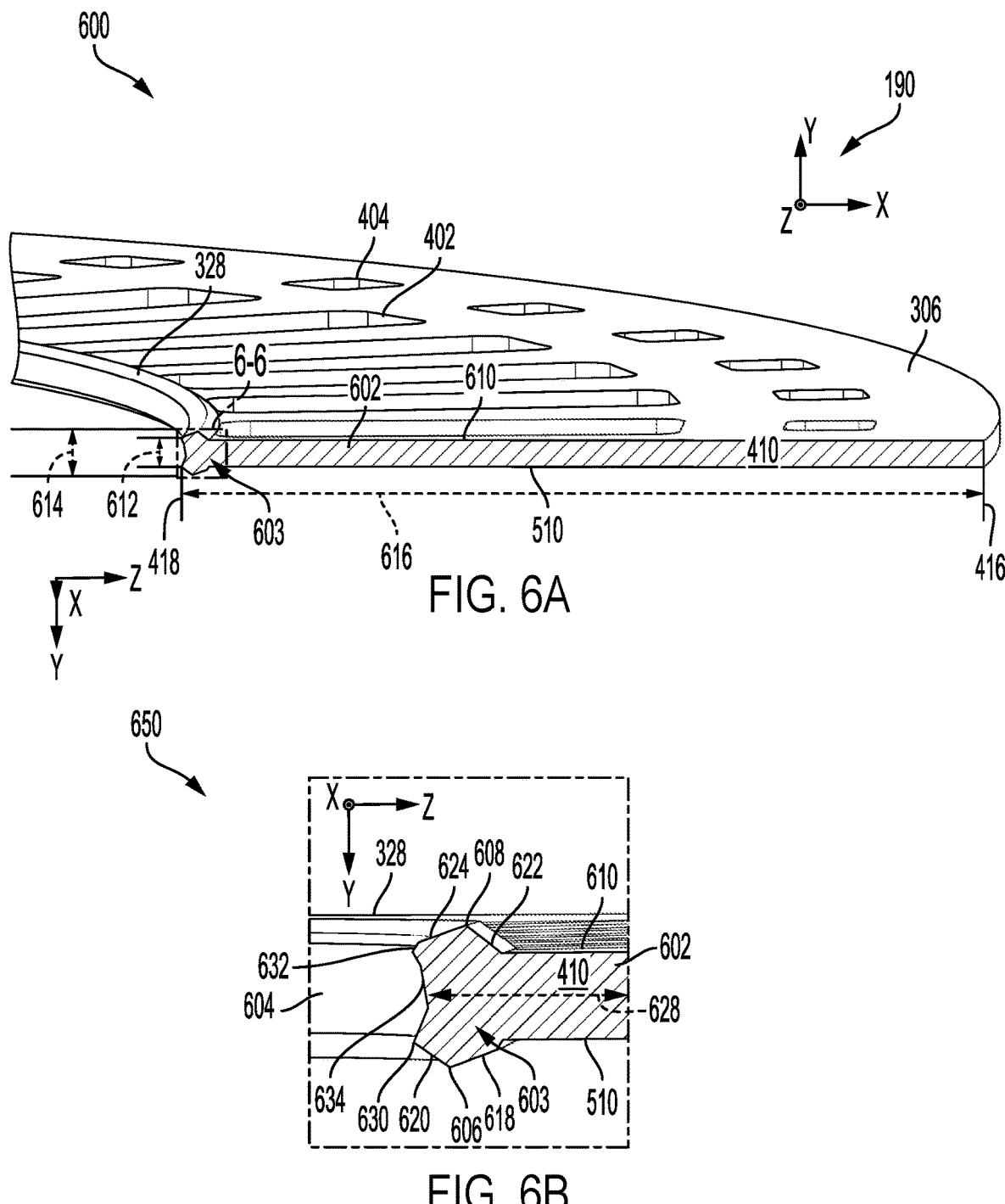
FIGS. 6A and 6B show different views of the elastomeric seal depicted in FIG. 3.

FIG. 6A and FIG. 6B shows a cross section view 600 of the elastomeric seal 306 of the sealing assembly 300 of a cooling system of an electric motor. The elastomeric seal 306 is shown in an uncompressed state. Elements introduced with reference to FIGS. 3-5 are numbered similarly and not reintroduced. A box 6-6 for an enlarged cross section view 650 depicted in FIG. 6B is provided in FIG. 6A.

Turning first to FIG. 6A, the cross section view 600 shows the molded annular bead 328 that defines the inner diameter 418 of the elastomeric seal 306, and the planar portion 410 extending radially from the molded annular bead 328 to the outer diameter 416. The elastomeric seal 306 may include a radial length 616 extending from the inner diameter 418 to the outer diameter 416. In one example, the radial length may have a threshold range (e.g., a range of thresholds) from 31.5 mm to 37.5 mm. The elastomeric seal 306 further includes a wall 602. In one example, in the uncompressed state shown by the cross section view 600 and the box 6-6, the molded annular bead 328 includes a radial thickening 603 having a concave profile in cross-section. For example, the wall 602 at the radial thickening 603 may be relatively thicker than the wall 602 extending through the planar portion 410. For example, the wall 602 may include a first axial length 612 that extends radially through the planar portion 410 and a second axial length 614 extending through the maximum dimension of the radial thickening 603 (e.g., along the y-axis). In one example, the second axial length 614 may include a threshold relative thickness range that is 1.7 to 1.5 times the first axial length 612. In one example, the second axial length 614 may have a threshold range of 1.6 mm to 2.3 mm. In one example, first axial length may have a threshold range of 0.8 cm to 1.45 mm.

Turning to FIG. 6B, in one example, the molded annular bead 328 may include a first protrusion 606 arranged on the first face 510 of the elastomeric seal 306, a second protrusion 608 arranged on a second face 610 of the elastomeric seal 306, and a concave groove 604 arranged axially between the first protrusion 606 and the second protrusion 608. The first protrusion 606 may include a first side 618 and second side 620. The first protrusion 606 ramps down (e.g., relative to the y-axis) and inward toward the inner diameter 418 along the first side 618. The first protrusion 606 ramps up and inward toward the inner diameter 418 along the second side 620. The second protrusion 608 may include a third side 622 and fourth side 624. The second protrusion 608 ramps up and inward toward the inner diameter 418 along the third side 622. The second protrusion 608 ramps down and inward toward the inner diameter 418 along the fourth side 624. The concave groove 604 may further include a first edge 630, a second edge 632, and a groove surface 634 extending axially therebetween. In one example, the first edge 630 may be approximately parallel with the first face 510 of the elastomeric seal 306 and the second edge 632 may approximately parallel with the second face 610. In one example, the elastomeric seal may be bilaterally symmetric along an axis 628 of bilateral symmetry. The axis 628 of bilateral symmetry may be parallel with the Z-axis (e.g., the vertical axis).

FIG. 7 shows an enlarged view 700 of the sealing assembly 300 of a cooling system of an electric motor including the elastomeric seal 306 interposed radially between the lateral surface 302a of the stator 302 and the sealing ring 304. The enlarged view 700 depicts the sealing interface 326 formed between the first axial wall 322 of the sealing ring 304, the second axial wall 324 of the stator 302, and the elastomeric seal 306. Elements introduced with reference to FIGS. 3-7 are numbered similarly and not reintroduced.

When the sealing assembly 300 is installed in the housing 110 of an electric motor assembly, upon final compression, a compressive force is exerted on the assembly. Arrows 702 indicate the compressive force exerted on the assembly formed between the sealing ring 304 and the stator 302, and the elastomeric seal 306 arranged therebetween. When compressed axially, the elastomeric seal 306 may be compressed in a first direction 702a by the sealing sleeve 308 and the inner flange 312. Likewise, when compressed axially, the elastomeric seal 306 may be compressed in a second direction 702b by the stator 302. The first direction 702a and the second direction 702b are opposite to one another.

The molded annular bead 328 may be relatively thermoplastic. For example, under relatively low pressure conditions and/or heat (e.g., ambient), the molded annular bead 328 may have an axial dimension that is the second axial length 614. However, under relatively higher pressure conditions and/or heat, such during final compression in the electric motor system, and during motor operation, the molded annular bead 328 may change size. For example, upon final compression, the molded annular bead 328 may compresses axially to approximately the first axial length 612. Further, axial compression of the molded annular bead 328 may cause extrusion (or extension) along the z-axis, filling the sealing interface 326. For example, the molded annular bead may compress to a vertical length (e.g., along the z-axis) of approximately 2 mm. In this way, the molded annular bead 328 may sit on and form a seal with the minimal sealing land of the sealing interface 326.

Due to the concave profile of the molded annular bead 328, the molded annular bead 328 extends up to, and no further than, the first axial wall 322 of the sealing ring 304 in a radially inward direction, as indicated by arrow 704, nor further than the second axial wall 324 that is approximately parallel with the first axial wall 322. By expanding up to, and no further than, the first axial wall 322 of the sealing ring 304 and the second axial wall 324 of the stator 302, the elastomeric seal 306 fluidly seals coolant in the sealed cavity 310 without protruding into the rotor core. Moreover, due to the relative plasticity of the elastomeric seal 306, the elastomeric seal 306 may conform to the sealing interface 326 as pressure and heat conditions change during motor operation, which may cause expansion and contraction of the sealing interface 326. The molded annular bead 328 may compress to the dimension of the sealing interface 326 under the range heat and pressure conditions of the operating motor without squeezing into the rotor core.

In this way, the disclosed sealing assembly for a cooling system for an electric motor may fluidly isolate coolant for stator end windings from an air gap formed between a stator and a rotor core. The sealing assembly includes an elastomeric seal configured for the stator end windings to pass through to a sealed cavity of the cooling system. The elastomeric seal further includes a molded annular bead that defines an inner diameter of the elastomeric seal, and which compresses axially, with respect to a longitudinal axis and/or rotational axis of the rotor, to seal an interface formed at the air gap. The molded annular bead may include a radial thickening having a concave profile in cross section. Upon final compression in an electric motor assembly, the geometry of the molded annular bead maintains the elastomeric seal on the minimal surface area, fluidly sealing the rotor without protruding past the interface. The technical effect of the sealing assembly is to effectively cool the stator end windings using a sealed cavity that reduces the chance of (e.g., avoids) coolant leakage into the rotor cavity, thereby increasing motor efficiency in relation to prior motor cooling systems.

The disclosure also provides support for a sealing assembly comprising: an elastomeric seal interposed radially between a lateral surface of a stator of an electric motor and a sealing ring, where the elastomeric seal comprises a plurality of openings configured to receive a plurality of end windings of the stator and a molded annular bead arranged to define an inner diameter of the elastomeric seal and configured to be compressed axially to further separate a coolant for the plurality of end windings from a rotor. In a first example of the system, in an uncompressed state the molded annular bead comprises a radial thickening having a concave profile in cross-section. In a second example of the system, optionally including the first example, in an uncompressed state the molded annular bead comprises a first protrusion arranged on a first face of the elastomeric seal, a second protrusion arranged on a second face of the elastomeric seal, and a concave groove arranged axially between the first protrusion and the second protrusion. In a third example of the system, optionally including one or both of the first and second examples, the first protrusion ramps down and inward toward the inner diameter from the first face of the elastomeric seal and the second protrusion ramps up and inward toward the inner diameter from the second face of the elastomeric seal. In a fourth example of the system, optionally including one or more or each of the first through third examples, the concave groove comprises a first edge, a second edge, and groove surface extending axially therebetween, wherein the first edge is approximately parallel with the first face of the elastomeric seal and the second edge is approximately parallel with the second face of the elastomeric seal. In a fifth example of the system, optionally including one or more or each of the first through fourth examples, upon final compression in an electric motor assembly, the molded annular bead extends up to, and no further than, an axial wall of the sealing ring in a radially inward direction. In a sixth example of the system, optionally including one or more or each of the first through fifth examples, the elastomeric seal comprises a planar portion extending radially from the molded annular bead to an outer diameter. In a seventh example of the system, optionally including one or more or each of the first through sixth examples, the plurality of openings comprises a plurality of square openings arranged radially outward from a plurality of rectangular openings, wherein the plurality of rectangular openings are configured to receive the plurality of end windings of the stator, and the plurality of square openings are configured to be in fluid communication with the plurality of rectangular openings. In a eighth example of the system, optionally including one or more or each of the first through seventh examples, the elastomeric seal is formed from molded rubber and the plurality of rectangular openings and the plurality of square openings are die cut. In a ninth example of the system, optionally including one or more or each of the first through eighth examples, each square opening of the plurality of square openings is radially aligned with a rectangular opening of the plurality of rectangular openings with respect to a central axis of the elastomeric seal.

The disclosure also provides support for a cooling system for an electric motor comprising: a stator comprising a plurality of end windings and a plurality of coolant passages extending axially through the stator, the plurality of coolant passages in fluid communication with the plurality of end windings, a sealing ring coupled the stator and including a plurality of channels receiving the plurality of end windings, a sealing sleeve in contact with the sealing ring and forming a sealed cavity between the sealing sleeve and the sealing ring, the sealed cavity configured to at least partially to immerse the plurality of end windings at least partially in a coolant, and an elastomeric seal interposed radially between a lateral surface of the stator and the sealing ring, where the elastomeric seal comprises a plurality of openings configured to receive the plurality of end windings and a molded annular bead arranged to define an inner diameter of the elastomeric seal and configured to be compressed axially to further separate the coolant for the plurality of end windings from a rotor. In a first example of the system, the elastomeric seal extends radially from an inner circumferential section of the sealing ring to an outer circumferential section of the sealing ring, the inner circumferential section facing a rotor core and the outer circumferential section facing a motor housing. In a second example of the system, optionally including the first example, the plurality of channels direct a flow of coolant towards the plurality of end windings from the plurality of coolant passages in the stator. In a third example of the system, optionally including one or both of the first and second examples, in an uncompressed state the molded annular bead comprises a sealing surface having a concave profile in cross-section, and where upon final compression in an electric motor assembly, the molded annular bead extends up to, and no further than, an axial wall of the sealing ring in a radially inward direction. In a fourth example of the system, optionally including one or more or each of the first through third examples, the elastomeric seal comprises a plurality of square openings arranged radially outward from a plurality of rectangular openings, wherein the plurality of square openings are in fluid communication with the plurality of coolant passages in the stator.

The disclosure also provides support for a method for a cooling system comprising: flowing a coolant from a plurality of coolant passages that extend through a stator into a sealed cavity that is formed between an elastomeric seal, a sealing ring and a sealing sleeve and encloses end windings of the stator, wherein the elastomeric seal includes a molded annular bead arranged to define an inner diameter of the elastomeric seal and configured to be compressed axially to further separate the coolant from an air gap formed at an interface between the stator and a rotor. In a first example of the method, the sealed cavity is fluidly isolated from a rotor cavity. In a second example of the method, optionally including the first example, in an uncompressed state the molded annular bead comprises a sealing surface having a concave profile in cross-section, and where upon final compression in an electric motor assembly, the molded annular bead extends up to, and no further than, an axial wall of the sealing ring in a radially inward direction. In a third example of the method, optionally including one or both of the first and second examples, the elastomeric seal comprises a planar portion extending radially from the molded annular bead to an outer diameter. In a fourth example of the method, optionally including one or more or each of the first through third examples, the planar portion comprises a plurality of rectangular openings and a plurality of square openings arranged radially outward from the plurality of rectangular openings, wherein the plurality of rectangular openings abut the molded annular bead, wherein the plurality of rectangular openings receive the end windings of the stator and the plurality of square openings flow coolant to the plurality of coolant passages.

In another representation, an electric motor comprising: a rotor, a stator circumferentially surrounding the rotor, an air gap positioned between the rotor and the stator, and an elastomeric seal interposed radially between a lateral surface of the stator and a sealing ring, where the elastomeric seal comprises a plurality of openings configured to receive a plurality of end windings of the stator and a molded annular bead arranged to define an inner diameter of the elastomeric seal and configured to be compressed axially to further separate a coolant for the plurality of end windings from entering the air gap.

FIGS. 1-7 are drawn approximately to scale, aside from the schematically depicted components. However, the components may have other relative dimensions, in other embodiments.

FIGS. 1-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. Even further, elements which are coaxial or parallel to one another may be referred to as such. As yet another example, features described as "substantially" shaped, e.g., annular, flat, planar, prismatic, circular, etc., means that the features are sufficiently shaped as such to be considered having the shape by one skilled in the art.

Note that the example control and estimation routines included herein can be used with various motor configurations. The control methods and routines disclosed herein may be stored as executable instructions in non-transitory memory and may be carried out by the control system including the controller in combination with the various sensors, actuators, and other electric drive and/or vehicle hardware in combination with the electronic controller. As such, the described actions, operations, and/or functions may graphically represent code to be programmed into non-transitory memory of the computer readable storage medium in the vehicle and/or driveline control system. One or more of the illustrated actions, operations and/or functions may be repeatedly performed depending on the particular strategy being used. One or more of the method steps described herein may be omitted if desired.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A sealing assembly comprising:
an elastomeric seal interposed radially between a lateral surface of a stator of an electric motor and a sealing ring, where the elastomeric seal comprises a plurality of openings configured to receive a plurality of end windings of the stator and a molded annular bead arranged to define an inner diameter of the elastomeric seal and configured to be compressed axially to further separate a coolant for the plurality of end windings from a rotor.

2. The sealing assembly of claim 1, where in an uncompressed state the molded annular bead comprises a radial thickening having a concave profile in cross-section.

3. The sealing assembly of claim 1, where in an uncompressed state the molded annular bead comprises a first protrusion arranged on a first face of the elastomeric seal, a second protrusion arranged on a second face of the elastomeric seal, and a concave groove arranged axially between the first protrusion and the second protrusion.

4. The sealing assembly of claim 3, wherein the first protrusion ramps down and inward toward the inner diameter from the first face of the elastomeric seal and the second protrusion ramps up and inward toward the inner diameter from the second face of the elastomeric seal.

5. The sealing assembly of claim 3, wherein the concave groove comprises a first edge, a second edge, and groove surface extending axially therebetween, wherein the first edge is approximately parallel with the first face of the elastomeric seal and the second edge is approximately parallel with the second face of the elastomeric seal.

6. The sealing assembly of claim 1, where upon final compression in an electric motor assembly, the molded annular bead extends up to, and no further than, an axial wall of the sealing ring in a radially inward direction.

7. The sealing assembly of claim 1, wherein the elastomeric seal comprises a planar portion extending radially from the molded annular bead to an outer diameter.

8. The sealing assembly of claim 1, wherein the plurality of openings comprises a plurality of square openings arranged radially outward from a plurality of rectangular openings, wherein the plurality of rectangular openings are configured to receive the plurality of end windings of the stator, and the plurality of square openings are configured to be in fluid communication with the plurality of rectangular openings.

9. The sealing assembly of claim 8, wherein the elastomeric seal is formed from molded rubber and the plurality of rectangular openings and the plurality of square openings are die cut.

10. The sealing assembly of claim 8, wherein each square opening of the plurality of square openings is radially aligned with a rectangular opening of the plurality of rectangular openings with respect to a central axis of the elastomeric seal.

11. A cooling system for an electric motor comprising:
a stator comprising a plurality of end windings and a plurality of coolant passages extending axially through the stator, the plurality of coolant passages in fluid communication with the plurality of end windings;
a sealing ring coupled the stator and including a plurality of channels receiving the plurality of end windings;
a sealing sleeve in contact with the sealing ring and forming a sealed cavity between the sealing sleeve and the sealing ring, the sealed cavity configured to at least partially to immerse the plurality of end windings at least partially in a coolant; and
an elastomeric seal interposed radially between a lateral surface of the stator and the sealing ring, where the elastomeric seal comprises a plurality of openings configured to receive the plurality of end windings and a molded annular bead arranged to define an inner diameter of the elastomeric seal and configured to be compressed axially to further separate the coolant for the plurality of end windings from a rotor.

12. The cooling system of claim 11, wherein the elastomeric seal extends radially from an inner circumferential section of the sealing ring to an outer circumferential section of the sealing ring, the inner circumferential section facing a rotor core and the outer circumferential section facing a motor housing.

13. The cooling system of claim 11, wherein the plurality of channels direct a flow of coolant towards the plurality of end windings from the plurality of coolant passages in the stator.

14. The cooling system of claim 11, where in an uncompressed state the molded annular bead comprises a sealing surface having a concave profile in cross-section, and where upon final compression in an electric motor assembly, the molded annular bead extends up to, and no further than, an axial wall of the sealing ring in a radially inward direction.

15. The cooling system of claim 11, wherein the elastomeric seal comprises a plurality of square openings arranged radially outward from a plurality of rectangular openings, wherein the plurality of square openings are in fluid communication with the plurality of coolant passages in the stator.

16. A method for a cooling system comprising:

flowing a coolant from a plurality of coolant passages that extend through a stator into a sealed cavity that is formed between an elastomeric seal, a sealing ring and a sealing sleeve and encloses end windings of the stator, wherein the elastomeric seal includes a molded annular bead arranged to define an inner diameter of the elastomeric seal and configured to be compressed axially to further separate the coolant from an air gap formed at an interface between the stator and a rotor.

17. The method of claim 16, wherein the sealed cavity is fluidly isolated from a rotor cavity.

18. The method of claim 16, where in an uncompressed state the molded annular bead comprises a sealing surface having a concave profile in cross-section, and where upon final compression in an electric motor assembly, the molded annular bead extends up to, and no further than, an axial wall of the sealing ring in a radially inward direction.

19. The method of claim 16, wherein the elastomeric seal comprises a planar portion extending radially from the molded annular bead to an outer diameter.

20. The method of claim 19, wherein the planar portion comprises a plurality of rectangular openings and a plurality of square openings arranged radially outward from the plurality of rectangular openings, wherein the plurality of rectangular openings abut the molded annular bead, wherein the plurality of rectangular openings receive the end windings of the stator and the plurality of square openings flow coolant to the plurality of coolant passages.

* * * * *